Patented July 8, 1947

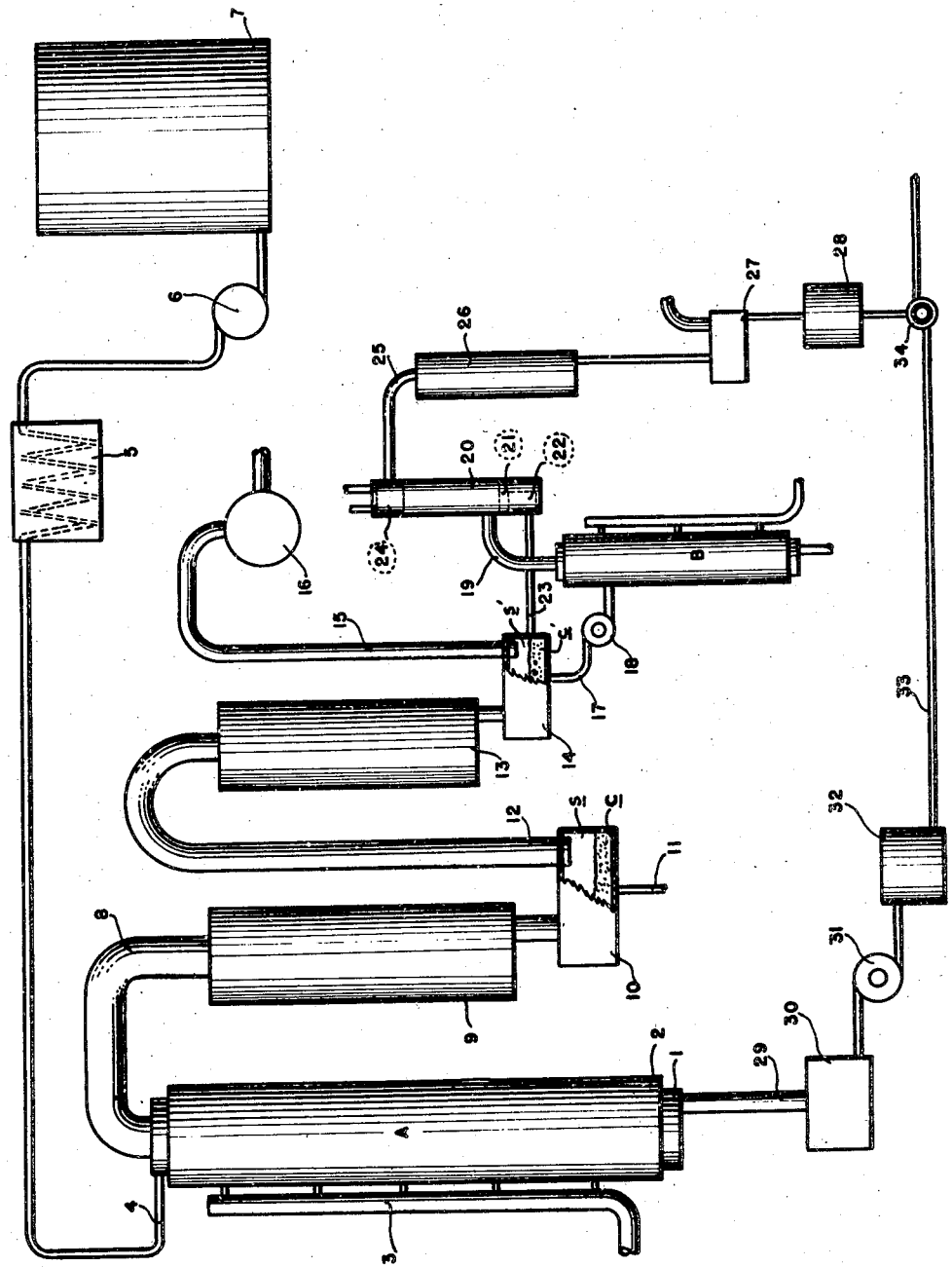

2,423,746

UNITED STATES PATENT OFFICE 2,423,746

METHOD FOR THE EVAPORATION AND CONCENTRATION OF LIQUIDS

George G. Zahm, Buffalo, N. Y., assignor to Hurd Corporation, New York, N. Y., a corporation of Delaware Application May 31, 1943, Serial No. 489,224

6 Claims. (Cl. 99—205)

This invention relates in general to apparatus and methods for the evaporation and concentration of liquids and more particularly food products such as fruit juices and the like. This application is related to my co-pending applications Serial No. 489,225 and 498,360.

Most liquid food products, juices and beverages contain many complex substances such as vitamins and other nutritive elements which are highly sensitive to destruction by heat, oxidation and hydrolysis. In addition to this, such liquids usually contain essential oils and delicate esters which contribute materially to the taste or flavor of the product. For this reason it has become common practice to evaporate this type of liquid under vacuum in vacuum pans and similar types of vacuum dryers or concentrators, so as to avoid the use of high temperatures. In addition to this, some efforts have been made to conduct evaporation or concentrating operations in the presence of a so-called "inert" atmosphere of carbon dioxide or nitrogen so as to overcome the danger of oxidation.

These expedients, however, have not been wholly satisfactory. Vacuum pans and other conventional vacuum dryers are most commonly operated on a batch rather than continuous basis and are therefore not particularly economical from the point of view of production costs. Furthermore, liquids of the type here under consideration, ordinarily contain sugars, glucosides and other related chemical substances which tend to increase the surface tension of the liquid and thereby produce foaming and entrainment problems in the apparatus. The employment of "inert" atmospheres to prevent oxidation has been found, in commercial practice, to be expensive and in some cases disadvantageous. For example, the so-called "inert" gases are not truly inert from a chemical point of view but are, in fact, dissolved or absorbed in the liquids and in some cases even chemically combined with the juices. Finally, where low-temperature vacuum evaporation is employed the liquid must be pasteurized at approximately 160° F. either before or after concentration and such additional exposure to heat produces a marked deterioration in the product.

It has been found, however, in connection with the present invention, that the two vital factors in the concentration of liquid food products are speed of operation and recovery of the essential flavor-producing ingredients. If, for example, the liquid is heated very rapidly and preferably in a single operation, it is possible to avoid any material loss or damage to vitamin content. If, at the same time the highly volatile, delicate flavor-producing ingredients are recovered and restored to the concentrate, it is possible also to preserve substantially all of the flavor characteristics of the natural product.

It is therefore one of the principal objects of the present invention to provide apparatus and methods for concentrating or evaporating liquid food products without losing, impairing or destroying the vitamins, flavor-producing ingredients and other component substances within the liquid.

It is a further object of the present invention to provide apparatus and methods of the type, and for the purposes stated, by which liquids such as fruit juices and the like may be evaporated continuously and at an extremely rapid rate so that each particular portion of the liquid being processed will be exposed to processing conditions for such a short period of time that the method may, for all practical purposes, be referred to as instantaneous pasteurizing evaporation.

It is another and very important object of the present invention to provide apparatus and methods for the evaporation and concentration of liquid food products whereby the esters and other flavoring constituents normally lost during evaporation may be efficiently recovered and restored to the concentrate, thereby preserving, unharmed and unchanged, the original and natural qualities of aroma and taste normally present in fresh unprocessed liquids.

It is an additional object of the present invention to provide apparatus and methods for concentrating and evaporating fruit juices and the like under relatively high vacuum and without loss of efficiency due to foaming or entrainment.

The above and other objects will become more fully apparent from the following specification which, by way of illlustration rather than limitation, sets forth preferred processes and preferred forms of apparatus constituting embodiments of the present invention, the scope of which is defined in the appended claims.

In the drawings (one sheet):

Figure 1 is a schematic view of a preferred form of apparatus embodying the present invention.

Referring now in more detail and by reference characters to the drawings, A designates a primary evaporating column comprising a central vertical tube 1, constructed of stainless steel, copper-bronze or other suitable material, due consideration being given to the corrosive tendencies or other chemical properties of the particular liquid food product being processed. The tube 1 is externally surrounded by a cylindrical steel steam jacket 2 provided with a steam manifold 3 connected to any conventional source or supply of live steam (the latter not being shown).

Entering into the upper end of the tube 1 is a supply line 4 connected through a conventional preheater 5 and metering pump 6 to a holding tank 7 for receiving the incoming liquid such as fresh natural fruit juice for example. The tube 1 is interiorly provided with any suitable type of distributing means for causing the incoming liquid to flow downwardly over the inner face of the tube 1 in a thin, uninterrupted, rapidly moving film. Connected to and leading out of the upper end of the tube 1 is a large cross header 8 which is in turn connected at its other end to the upper end of a water-jacketed fractionating condenser 9, which discharges at its lower end into a receiver 10 having a substantial vapor space s above the level of condensate c, the latter being withdrawn through the pipe 11 by any suitable eduction means (not shown) and discarded.

Opening at its lower end into the vapor space s of the receiver 10 is a reverse-bend vapor-pipe 12 connected at its other end to a water-jacketed secondary condenser 13 which in turn discharges at its lower end into a secondary receiver 14 substantially similar to the receiver 10 and likewise having a substantial vapor space s' above the level of condensate c'. Opening at its lower end into the vapor space s' of the receiver 14 is a vacuum line 15 connected, in turn, at its other end to a conventional trap 16 and thence to a vacuum pump (not shown).

Leading out of the bottom of the receiver 14 is a discharge line 17, connected to the intake side of a discharge pump 18 which, in turn, is connected at its discharge side to a secondary evaporating column B, smaller than but otherwise substantially similar to evaporating column A and preferably designed to operate at atmospheric pressure. At its upper end the evaporating column B is provided with a vapor discharge line 19 opening into the lower end of a reflux condenser 20, having a condensate sump 21 and a conventional float controlled return valve mechanism 22 for permitting the condensate to be returned through the return line 23 to the receiver 14 for recycling to column B. At its upper end the reflux condenser 20 is provided with a suitable cooling coil 24 for maintaining the desired reflux ratio, and leading out of the upper end of the reflux condenser 20 is a vapor line 25 extending into a final condenser 26 connected at its lower end to a receiver 27 which is vented to atmosphere and, in turn, discharges into a small holding tank 28.

The evaporating column A is provided at its lower end with a concentrate discharge line 29 emptying into a concentrate receiver 30 from which hot concentrate is immediately and quickly withdrawn by a discharge pump 31 for delivery at atmospheric pressure to an intermediate holding or "surge" tank 32 of relatively small volume and adapted primarily to compensate for momentary variations in the flow rate of the concentrate, the latter flowing more or less directly and speedily through the line 33 to one inlet of a conventional mixing valve 34 which is connected at its other inlet to the receiver 27 and at its outlet to conventional can-filling and cooling apparatus (not shown).

In operation the liquid is introduced into the tank 7 from extraction or other conventional preparatory equipment and rapidly forced by the metering pump 6 through the preheater 5 into the tube 1 of evaporating column A. The tank 7 should be only large enough to accommodate enough liquid to supply the evaporator for a very few minutes so that the fresh liquid will only remain in the tank 7 for a comparatively short period of time and accordingly the extraction equipment must be of such size as to maintain a fairly uniform and constant flow of liquid in sufficient volume to keep pace with the capacity of the evaporating column A.

The incoming unconcentrated liquid is introduced at relatively high velocity into the tube 1 and is caused to flow over the inner face of the tube 1 in a thin substantially continuous sheet or film. In effect the inner face of the tube 1 is covered with a very thin tubular sheath of liquid moving at high velocity and shearing off any bubbles of vapor or solid particles which tend to form on the tube face. It is thought that this "shearing-off" action preserves a uniform and unbroken metal-to-liquid heat transfer relationship over practically the entire area of the tube face and effectively obviates the insulating effect which otherwise results from bubble formation and the deposition of solid matter or "crusting" as it may be called.

The high velocity film further operates to promote surface evaporation with a minimum of bubbling or foaming and, as a result, eliminates entrainment, that is to say, the carrying over of partially concentrated liquid with the vapor being drawn into the condenser.

Steam at suitable temperature and pressure is admitted to the steam jacket 2 through the manifold 3, so as to heat the tube 1 uniformly throughout its length and heat the liquid passing through the tube to approximately 165° F., thus pasteurizing the liquid at the same time as it is being concentrated. From the evaporating column A, the concentrate flows through the line 27 to receiver 30 from which it is withdrawn by means of the discharge pump 31 and delivered at atmospheric pressure to the small holding tank 32.

When operating at a temperature of about 165° F. a vacuum of approximately 20" of mercury is maintained in the apparatus by means of a suitable vacuum pump (not shown). In this connection, however, it should be noted that the degree of vacuum is a function of the temperature employed in the column A. For instance, if a low pasteurizing temperature of approximately 140° F. were to be used a vacuum of about 24" of mercury would be desirable.

The vapor produced in the cloumn A will contain a very large proportion of the esters and flavor-producing ingredients of the liquid. In fact, I have found that the flat non-aromatic taste which has heretofore been more or less accepted in the industry as an undesirable but nevertheless unavoidable characteristic of concentrated liquid food products is due largely to this loss of the esters and other volatile flavor-producing ingredients. According to the present invention, therefore, such vapor is drawn through the cross header 8 and fractionally condensed in the primary or fractionating condenser 9, under temperature conditions which will result in the condensation of the water vapor without condensing any substantial quantity of the esters and other flavor-producing ingredients. The water condensate is discharged from the receiver 10 to a suitable waste line while the uncondensed vapor, now very rich in ester content, passes over through the line 12 into the condenser 13 wherein it is condensed and discharged into the receiver 14.

The condensate c' thus collected in the receiver 14 is then withdrawn through the pump 18 and fed, preferably at atmospheric pressure, into a secondary evaporating column B and in effect fractionally distilled through the reflux column 20 and condenser 26 to produce a very highly concentrated ester fraction which is collected in the receiver 27 and ultimately delivered to the small holding tank 28.

From the holding tanks 28 and 32 respectively, the ester fraction and the concentrate are brought together in the mixing valve 34 in measured proportion corresponding to original ester concentration of the fresh liquid and immediately delivered to the canning machinery wherein it is rapidly canned, sealed and cooled.

It will, of course, be evident that when the apparatus is first put into operation the initial concentrate may have to be discarded or allowed to accumulate for a few minutes or supplied with the ester fraction of a previous run until the ester fraction begins to come over and accumulate in the receiver 27 and holding tank 28. Thereafter, however, the operation may be continuous for as long a period as fresh liquid is available, barring accidents, breakdowns and similar fortuitous circumstances. It should also be noted that the entire operation is carried out continuously and at a very high flow rate. In fact, it has been found that the liquid passes from the tank 7 through the entire apparatus and is delivered to the canning machinery in a matter of 1 to 2 minutes, depending to some extent, of course, upon the compactness of the installation and the length of pipe line which must be traversed and in fact it is highly important that such pipe lines be as direct as possible so that the interval during which the liquid is kept hot will be as short as possible. It should be particularly noted that during this time the liquid is exposed to the heating surface for only a few seconds.

In this connection it may be well to point out that the length of the column A is directly reflected in the amount of heating which must be done in relation to such factors as the initial temperature and specific gravity of the uncon-centrated liquid, and the specific gravity desired in the final product. The preheater 5 is not, in any sense a separate or extra heating operation but merely an adjunctive element making possible the use of a somewhat shorter column. Actually the liquid travels so rapidly through the entire apparatus that the temperature rise in the liquid follows a very sharp and unbroken gradient from the time the liquid starts through the preheater until it finally reaches the upper limit of 165° F. within the column A.

By reason of the very short period of time during which the liquid is held at an elevated temperature, the loss, impairment or destruction of vitamins and other nutrient substances is largely prevented. At the same time the highly volatile, delicate esters and other flavor-producing substances are almost immediately pulled out of the liquid as it enters the column A and the ensuing process of rapid, fractional condensation and reflux concentration recovers such esters and related substances in unchanged form for ultimate restoration to the concentrate.

It should be understood that changes and modifications both in the methods as well as in the form, construction, arrangement and combination of the several parts of the apparatus for evaporating or concentrating liquids may be made and substituted for those herein shown and discussed without departing from the nature and principle of the present invention.

Having thus described the present invention, what is desired to be secured by these Letters Patent is included in the following claims:

1. The method of concentrating liquids such as fruit juices, beverages, extracts, and infusions which comprises continuously flowing the liquid at high velocity over a heat exchange surface under vacuum and thereby continuously separating the liquid into a concentrate portion and a vapor portion, continuously fractionally condensing the vapor portion without breaking the vacuum to recover therefrom a concentrated fraction containing volatile flavor-producing ingredients originally present in such liquid food product, and continuously reintroducing such concentrated fraction into the concentrate portion without breaking the vacuum.

2. The method of concentrating liquid food products such as fruit juices, beverages, extracts, and infusions, which method comprises rapidly flowing the liquid food product in a thin film over the heat exchange surface under high vacuum and thereby separating said liquid food product into a concentrate portion and a vapor portion, the latter containing volatile flavor producing ingredients, passing said vapor portion through a successive series of condensers without breaking the vacuum for separating such vapor into a relatively large volume of substantially aqueous condensate and a separate relatively small volume of highly concentrated condensate consisting substantially of the flavor producing ingredients, further concentrating such concentrated condensate without breaking the vacuum, and finally re-introducing such concentrated condensate into the concentrate without breaking the vacuum.

3. The method of concentrating liquid food products such as fruit juices, beverages, extracts, and infusions, which method comprises rapidly flowing the liquid food product in a thin film over a heat exchange surface under high vacuum and thereby separating said liquid food product into a concentrate portion and a vapor portion, the latter containing volatile flavor producing ingredients, passing said vapor portion directly into a first condenser without breaking the vacuum and therein initially reducing the water content of the vapor portion without materially condensing the flavor producing constituents, passing the residual vapor directly into a second condenser without breaking the vacuum, and therein finally condensing all of the residual vapors to form a concentrated liquid fraction containing the flavor producing constituents, passing said liquid fraction in a thin film over a second heat exchange surface while still maintaining vacuum conditions thereon and thereby removing from said liquid fraction a vapor portion consisting substantially entirely of flavor producing ingredients, condensing such vapor portion without breaking the vacuum and thereby producing a highly concentrated condensate consisting substantially entirely of flavor producing ingredients, and re-introducing such highly concentrated condensate into the concentrate.

4. The method of concentrating liquid food products such as fruit juices, beverages, extracts, and infusions, which method comprises rapidly flowing the liquid food product in a thin film over a heat exchange surface under high vacuum and thereby separating said liquid food product into a concentrate portion and a vapor portion, the latter containing volatile flavor producing ingredients, passing said vapor portion directly into a first condenser without breaking the vacuum and therein initially reducing the water content of the vapor portion without materially condensing the flavor producing constituents, passing the residual vapor directly into a second condenser without breaking the vacuum and therein finally condensing all of the residual vapors to form a concentrated liquid fraction containing the flavor producing constituents, passing said liquid fraction in a thin film over a second heat exchange surface while still maintaining vacuum conditions thereon and thereby removing from said liquid fraction a vapor portion consisting substantially entirely of flavor producing ingredients, condensing such vapor portion without breaking the vacuum and thereby producing a highly concentrated condensate consisting substantially entirely of flavor producing ingredients, and re-introducing such highly concentrated condensate into the concentrate without breaking the vacuum.

5. The method of concentrating liquid food products such as fruit juices, beverages, extracts, and infusions, which method comprises rapidly flowing the liquid food product in a thin film over a heat exchange surface at pasteurizing temperature under high vacuum and thereby separating said liquid food product into a concentrate portion and a vapor portion, the latter containing volatile flavor producing ingredients, passing said vapor portion through a successive series of condensers without breaking the vacuum for separating such vapor into a relatively large volume of substantially aqueous condensate and a separate relatively small volume of highly concentrated condensate consisting substantially of the flavor producing ingredients, further concentrating such concentrated condensate without breaking the vacuum, and finally re-introducing such concentrated condensate into the concentrate without breaking the vacuum.

6. The method of concentrating liquid food products such as fruit juices, beverages, extracts, and infusions, which method comprises rapidly flowing the liquid food product in a thin film over a heat exchange surface at approximately 165° F. under high vacuum and thereby separating said liquid food product into a concentrate portion and a vapor portion, the latter containing volatile flavor producing ingredients, passing said vapor portion through a successive series of condensers without breaking the vacuum for separating such vapor into a relatively large volume of substantially aqueous condensate and a separate relatively small volume of highly concentrated condensate consisting substantially of the flavor producing ingredients, further concentrating such concentrated condensate without breaking the vacuum, and finally re-introducing such concentrated condensate into the concentrate without breaking the vacuum.

GEORGE G. ZAHM.

REFERENCES CITED

The following references are of record in the file of this patent:

UNITED STATES PATENTS

| Number | Name | Date |
| --- | --- | --- |
| 1,189,127 | Kellogg | June 27, 1916 |
| 2,217,261 | Stevens | Oct. 8, 1940 |
| 2,104,415 | Davies | Jan. 4, 1938 |
| 2,156,212 | Wendt | Apr. 25, 1939 |
| 2,145,395 | Horvath | Jan. 31, 1939 |
| 2,098,961 | Fronmuller | Nov. 16, 1937 |
| 48,268 | Gale | June 20, 1865 |
| 2,155,971 | Houseman | Apr. 25, 1939 |
| 1,730,892 | Leslie | Oct. 8, 1929 |